Patented Apr. 6, 1943

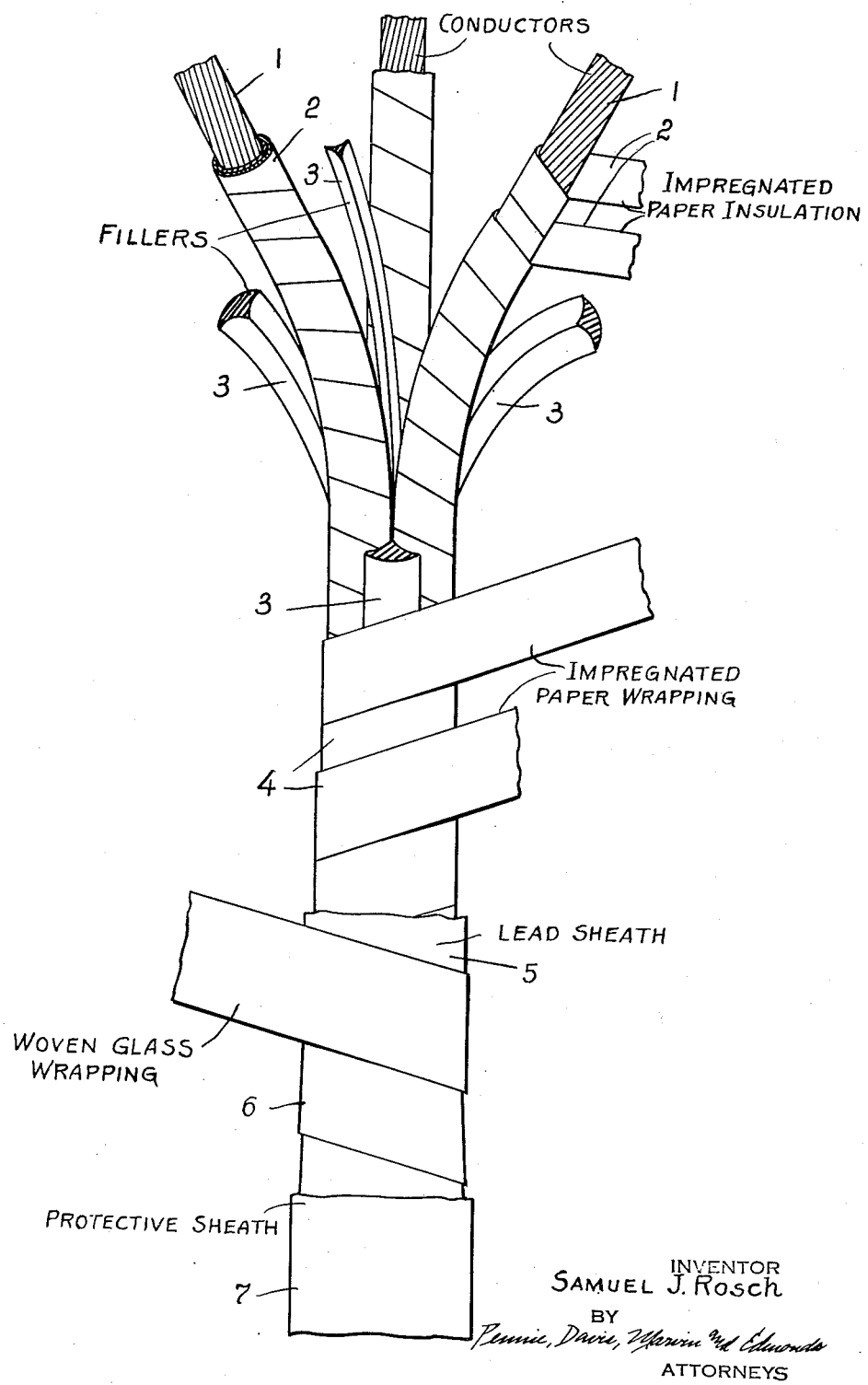

2,315,736

UNITED STATES PATENT OFFICE 2,315,736

ELECTRIC CABLE

Samuel J. Rosch, Yonkers, N. Y., assignor to Anaconda Wire and Cable Company, New York, N. Y., a corporation of Delaware Application April 24, 1940, Serial No. 331,326

9 Claims. (Cl. 174—107)

This invention relates to electric cables of the lead sheathed type and has for its object the provision of an improved cable construction of this type.

Lead sheaths are commonly applied to electric conductors insulated with impregnated fibrous material, such for example as paper, textiles etc. The fibrous material is commonly impregnated with an insulating liquid of high dielectric strength, such for example as oil, bitumen, tar etc. Such cables frequently encounter operating conditions that cause the pressure inside the lead sheath to rise considerably above the atmospheric pressure. These conditions may arise from the usual heating and cooling cycles incidental to cable operation, or may be occasioned by the installation of the cable in a vertical or steeply inclined position. Whatever the cause, increased pressures within the lead sheath tends to distend the sheath, and ultimately to so weaken it that the lead cracks or ruptures, thereby impairing its function of protecting the cable from deformation, mechanical damage and the deleterious effects of extraneous fluids. Various expedients have been proposed for reinforcing the lead sheath and thus minimizing its tendency to distend upon the occurrence of increased internal pressure, but so far as I am aware no entirely satisfactory solution of the problem has heretofore been achieved.

In accordance with the present invention, the lead sheath of an impregnated insulated cable is effectively reinforced against expansion or distension by a covering of woven glass fibers. This covering may be conveniently applied to the lead sheath in the form of a woven glass tape spirally wrapped around the lead sheath. In cases where the conditions of installation may cause injury to the woven glass covering, such as pulling of the cable over sharp projections etc., a layer of suitable fibrous tape or braid can be applied over the woven glass covering without in any way impairing its effectiveness in reinforcing the lead sheath.

The invention will be better understood from the following description taken in conjunction with the accompanying drawing, in which the single figure diagrammatically illustrates an electric cable embodying the invention.

The electric cable illustrated in the drawing is of the multi-conductor type and has three stranded metallic conductors or wires 1, each appropriately insulated with a surrounding layer 2 of fibrous insulating material. The three insulated metallic conductors are twisted or otherwise appropriately assembled into a unitary structure, with fillers 3 of fibrous insulating material in the longitudinal interstitial spaces between the insulated conductors, and the structure is covered and held in its assembled position by a surrounding layer 4 of fibrous insulating material. The fibrous insulating materials of the layers 2 and 4 and the fillers 3 may be paper, fabric or the like, and are impregnated with an appropriate fluid insulating compound of high dielectric strength, such as oil, bitumen, tar etc. The so-insulated cable is encased or covered with a lead sheath 5 which holds the assembly together and further serves to protect the cable from mechanical damage and from chemical attack.

In accordance with the present invention the lead sheath 5 is covered by a flexible layer 6 of woven glass fibers. The woven glass fibers may conveniently be applied to the lead sheath in the form of a flexible woven glass tape wrapped or wound spirally about the sheath. In practice, very satisfactory results have been obtained with glass tape woven 0.005 inch thick and 1½ inches wide, wound with from one-fourth to one-half width overlap. However, these dimensions are not critical, and the tape may be of any suitable width and may be woven thicker or thinner, and may be applied to the lead sheath by any of the procedures customary in the art and with any desired overlap. One or more layers of the woven glass tape may be applied, depending upon the amount of reinforcement desired. The cable illustrated in the drawing has an outer protective layer 7 of fibrous tape or braid covering the layer 6 of woven glass fibers.

The woven glass covering of the invention increases the resistance of the lead sheath to distension or rupture far in excess of the values necessary or encountered in solid type cable operation. The tensile strength of the usual lead sheath for paper-insulated cables is around 2000 to 2500 pounds per square inch, while the tensile strength of woven glass 0.005 inch thick is around 80,000 to 120,000 pounds per square inch. Cables of the invention are therefore able to indefinitely withstand, without the slightest sign of fatigue or tendency to rupture, or measurable increase in diameter, internal pressures which would cause the heretofore customary lead-sheathed cables of this type to burst within a few hours.

Since the present thicknesses of lead sheaths for paper-insulated cables are predicated upon mechanical considerations, and since the addition of a woven glass covering over the lead sheath increases its mechanical resistance manyfold, it is possible to reduce the present thickness of the lead sheaths of such cables by at least 1/64 inch (0.015 inch), by the use of a woven glass covering approximately 0.005 inch in thickness. Since the specific gravity of lead is many times that of glass, the substitution of a woven glass covering 0.005 inch in thickness for 1/64 inch wall of lead considerably decreases the total weight of the lead sheath, thereby decreasing the weight of the finished cable, without any increase in its overall diameter.

The installation of electric cables in vertical or steeply inclined position has heretofore required the use of metallic or other types of armorings to prevent undue expansion of the lead sheaths of such cables caused by migration of impregnating compound. Such armorings are both bulky and heavy and cause a considerable increase in weight of material that has to be supported by some means of cable suspension. By the present invention, the lead sheaths of such cables are adequately reinforced without appreciable, if any, increase in diameter and without any increase in weight of the cable to be suspended.

Lead sheathed cables at present installed aerially outdoors are subject to intercrystalline fracture and other forms of lead sheath disintegration as a result of cable vibration. Such cables installed for operation on bridges, unless provided with special and costly protective measures, are often subject to similar failures of the lead sheath. The woven glass covering of the lead sheathed cable of the invention effectively and definitely protects the lead sheath of a cable subjected to such operating conditions.

It is to be understood that the outer protective covering 7 may be formed of various materials depending upon the conditions to which the cable is subjected in installation or operation or both, and if desired may be a sheath of lead or other suitable material capable of imparting the desired protection to the underlying layer of woven glass.

I claim:

1. An electric cable comprising a metallic conductor, fibrous insulating material surrounding the metallic conductor, a fluid insulating compound impregnating the fibrous insulating material, a lead sheath encasing the conductor and fibrous insulating material, and a woven glass covering applied directly to the surface of and surrounding the lead sheath and reinforcing said sheath against distension as a result of pressure exerted within the sheath.

2. An electric cable comprising a metallic conductor, fibrous insulating material surrounding the metallic conductor, a fluid insulating compound impregnating the fibrous insulating material, a lead sheath encasing the conductor and fibrous insulating material, and a spirally wound layer of woven glass tape applied directly to the surface of and surrounding the lead sheath and reinforcing said sheath against distension.

3. In an electric cable having a metallic conductor covered with fibrous insulating material impregnated with a fluid insulating compound and encased in a lead sheath, the improvement which comprises a covering of woven glass fibers applied directly to the surface of and surrounding the lead sheath and reinforcing said sheath against distension.

4. An electric cable comprising a metallic conductor, fibrous insulating material surrounding the metallic conductor, a fluid insulating compound of high dielectric strength impregnating the fibrous insulating material, a lead sheath encasing the conductor and fibrous insulating material, and a flexible tape of woven glass fibers wrapped about the lead sheath in direct contact with the surface thereof in such a manner as to reinforce said sheath against distension due to pressure exerted from within the sheath.

5. An electric cable comprising a metallic conductor, fibrous insulating material surrounding the metallic conductor, a fluid insulating compound impregnating the fibrous insulating material, a lead sheath encasing the conductor and fibrous insulating material, a woven glass covering applied directly to the surface of and surrounding the lead sheath and reinforcing said sheath against distension, and a protective outer covering surrounding said woven glass covering.

6. In an electric cable having a metallic conductor covered with fibrous insulating material impregnated with a fluid insulating compound and encased in a lead sheath, the improvement which comprises a covering of woven glass fibers applied directly to the surface of and surrounding the lead sheath and reinforcing said sheath against distension as a result of pressures exerted within the sheath, and a protective outer covering of fibrous material surrounding said woven glass covering.

7. An electric cable comprising a plurality of metallic conductors each having a layer of fibrous insulating material applied thereabout, said insulated conductors being assembled together to form a cable and having an outer covering of fibrous insulating material, fluid insulating compound impregnating said fibrous insulating materials, a lead sheath encasing said assembly of insulated conductors, and a woven glass covering applied directly to the surface of and surrounding the lead sheath and reinforcing said sheath against distension as a result of pressures exerted within the sheath.

8. An electric cable comprising a plurality of metallic conductors each having a layer of fibrous insulating material applied thereabout, said insulated conductors being assembled together to form a cable with fillers of fibrous insulating material in the longitudinal interstitial spaces between the insulated conductors and with an outer covering of fibrous insulating material, a fluid insulating compound of high dielectric strength impregnating the fibrous insulating materials of the assembly, a lead sheath encasng said assembly, and a flexible tape of woven glass fibers wrapped about said lead sheath in direct contact with the surface thereof in such a manner as to reinforce said sheath against distension due to pressure exerted from within the sheath.

9. An electric cable comprising a plurality of metallic conductors each of which is surrounded by a layer of fibrous insulating material, said insulated conductors being assembled together to form a cable and having an outer covering of fibrous insulating material surrounding the assembly, fluid insulating compound impregnating said fibrous insulating materials, a lead sheath encasing said assembly of insulated conductors, a covering of woven glass applied directly to the surface of and surrounding said lead sheath and reinforcing said sheath against distension as a result of pressures exerted within the sheath, and a protective outer covering surrounding said woven glass covering.

SAMUEL J. ROSCH.